(12) United States Patent
Airosa

(10) Patent No.: US 9,056,381 B1
(45) Date of Patent: Jun. 16, 2015

(54) LINE TRIMMER/GRINDER SYSTEM

(71) Applicant: Frank L. Airosa, Tulare, CA (US)

(72) Inventor: Frank L. Airosa, Tulare, CA (US)

( * ) Notice: Subject to any disclaimer, the term of this patent is extended or adjusted under 35 U.S.C. 154(b) by 0 days.

(21) Appl. No.: 14/140,121

(22) Filed: Dec. 24, 2013

Related U.S. Application Data

(63) Continuation-in-part of application No. 13/135,644, filed on Jul. 12, 2011, now abandoned.

(51) Int. Cl.
*B24B 23/00* (2006.01)
*B24B 23/02* (2006.01)
*A01D 42/00* (2006.01)

(52) U.S. Cl.
CPC ............... *B24B 23/02* (2013.01); *A01D 42/00* (2013.01)

(58) Field of Classification Search
USPC .......... 172/13; 30/276, DIG. 5; 451/344, 353, 451/358, 359; 56/255; D15/14, 29
See application file for complete search history.

(56) References Cited

U.S. PATENT DOCUMENTS

| | | | | |
|---|---|---|---|---|
| 2,115,265 A | * | 4/1938 | Jennett | 30/276 |
| 2,149,463 A | * | 3/1939 | Orr | 56/10.1 |
| 3,110,993 A | * | 11/1963 | Grage | 451/450 |
| 3,221,481 A | * | 12/1965 | Mattson et al. | 56/16.9 |
| 3,754,359 A | * | 8/1973 | Scandaletos | 451/488 |
| 4,058,936 A | * | 11/1977 | Marton | 451/359 |
| 4,104,797 A | * | 8/1978 | Ballas | 30/276 |
| 4,124,938 A | * | 11/1978 | Ballas, Sr. | 30/276 |
| 4,274,201 A | * | 6/1981 | Oberg et al. | 30/276 |
| 4,404,706 A | * | 9/1983 | Loyd | 15/344 |
| 4,641,431 A | * | 2/1987 | Leming et al. | 30/276 |
| 5,023,998 A | * | 6/1991 | Masciarella et al. | 30/276 |
| 5,544,417 A | * | 8/1996 | Atos et al. | 30/276 |
| 5,890,352 A | * | 4/1999 | Molina | 56/12.7 |
| 5,987,756 A | * | 11/1999 | Yates et al. | 30/276 |
| 2008/0301902 A1 | * | 12/2008 | Gloger et al. | 15/405 |

* cited by examiner

*Primary Examiner* — Joseph J Hail
*Assistant Examiner* — Tyrone V Hall, Jr.

(57) ABSTRACT

A support pole has upper, lower and intermediate extents. A motor with a drive shaft is coupled to the lower extent of the support pole. A grinding component is coupled to the drive shaft. The grinding component includes an annular plate below, a cylindrical sleeve above and a hemispherical dome there between. The sleeve is adapted to receive the drive shaft. The annular plate has a downwardly facing abrasive surface. The dome ventilation apertures. A bushing is coupled to the drive shaft for axial securement of the dome and abrasive surface to the motor.

7 Claims, 5 Drawing Sheets

LINE TRIMMER/GRINDER SYSTEM

RELATED APPLICATION

The present application is a continuation-in-part of pending application Ser. No. 13/135,644 filed Jul. 12, 2011, the subject matter of which is incorporated herein by reference.

BACKGROUND OF THE INVENTION

Field of the Invention

The present invention relates to a line trimmer/grinder system and more particularly pertains to conversion between a device for trimming lawn/yard growth and a device for grinding hard planar construction surfaces, the conversion being done in a safe, convenient and economical manner.

SUMMARY OF THE INVENTION

In view of the disadvantages inherent in the known types of trimmer/grinder systems of known designs and configurations now present in the prior art, the present invention provides an improved line trimmer/grinder system. As such, the general purpose of the present invention, which will be described subsequently in greater detail, is to provide a new and improved line trimmer/grinder system and method which has all the advantages of the prior art and none of the disadvantages.

To attain this, the present invention essentially comprises a line trimmer/grinder system. First provided is a support pole. The support pole has an upper extent. The support pole has a lower extent. The support pole has an intermediate extent. The intermediate extent is provided between the upper and lower extents. The upper extent has an upper handle. The handle has operating controls. In this manner the pole may be manipulated by a user. The intermediate extent has an intermediate handle.

An operating assembly is provided. The operating assembly is coupled to the lower extent of the support pole. The operating assembly includes a motor. The motor has a downwardly extending drive shaft. The drive shaft is rotatable about a vertical primary axis. The motor and the drive shaft are operable in response to the operating controls. The drive shaft has a lower free end. The lower free end has male screw threads. The drive shaft has splines. The splines are provided parallel with the primary axis. The splines are located above the male screw threads.

A grinding component is provided next. The grinding component is adapted to selectively couple with the drive shaft when line trimmer components are removed. The grinding component includes an annular plate. The annular plate is provided below.

The grinding component includes a cylindrical sleeve. The cylindrical sleeve is provided above. The grinding component includes a hemispherical dome. The dome is provided between the plate and the sleeve. The sleeve has an interior surface. The interior surface is adapted to receive the drive shaft. The sleeve has an exterior surface. The exterior surface has laterally spaced, outwardly facing planar faces. The annular plate has a downwardly facing abrasive surface. The abrasive surface is fabricated of crushed diamonds. The crushed diamonds are provided in a metal matrix. Other suitable materials include tungsten, carbon steel and other abrasive materials.

The dome has circular ventilation apertures for suction and increased air flow in addition to ventilation. In this manner ground-off particles including solid and fibrous material including grass and plant material from beneath the abrasive surface may pass upward through the ventilation apertures.

Further provided is a bushing. The bushing has female screw threads. The bushing is located within the dome. The female screw threads of the bushing are coupled to the male screw threads of the drive shaft. In this manner the dome and abrasive surface are axially secured to the motor. The screw threads of the bushing and drive shaft are left hand screws.

Provided last is an intermediate component. The intermediate component is positionable between the motor and the abrasive surface. The intermediate component has a splined interior surface. The interior surface receives the splines of the drive shaft. In this manner the splines may rotate concurrently with the drive shaft. The intermediate component has downwardly extending blocks. The blocks have inwardly facing faces. The faces are positionable in contact with the outwardly facing planar faces of the cylindrical sleeve. In this manner the annular abrasive surface is rotated when the motor is energized through the controls at the upper handle. An intermediate bushing is provided between the intermediate component and the dome.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved line trimmer/grinder system which has all of the advantages of the prior art trimmer/grinder systems of known designs and configurations and none of the disadvantages.

It is another object of the present invention to provide a new and improved line trimmer/grinder system which may be easily and efficiently manufactured and marketed.

It is further object of the present invention to provide a new and improved line trimmer/grinder system which is of durable and reliable constructions.

An even further object of the present invention is to provide a new and improved line trimmer/grinder system which is susceptible of a low cost of manufacture with regard to both materials and labor, and which accordingly is then susceptible of low prices of sale to the consuming public, thereby making such line trimmer/grinder system economically available to the buying public.

Even still another object of the present invention is to provide a line trimmer/grinder system for conversion between a device for trimming lawn/yard growth and a device for grinding hard planar construction surfaces, the conversion being done in a safe, convenient and economical manner.

Lastly, it is an object of the present invention to provide a new and improved line trimmer/grinder system. A support pole has upper, lower and intermediate extents. A motor with a drive shaft is coupled to the lower extent of the support pole. A grinding component is coupled to the drive shaft. The grinding component includes an annular plate below, a cylindrical sleeve above and a hemispherical dome there between. The sleeve is adapted to receive the drive shaft. The annular plate has a downwardly facing abrasive surface. The dome has ventilation apertures for suction and increased air flow in addition to ventilation. A bushing is coupled to the drive shaft for axial securement of the dome and abrasive surface to the motor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures of the primary and alternate embodiments disclosed herein.

DESCRIPTION OF THE PREFERRED EMBODIMENTS

Figure 1:
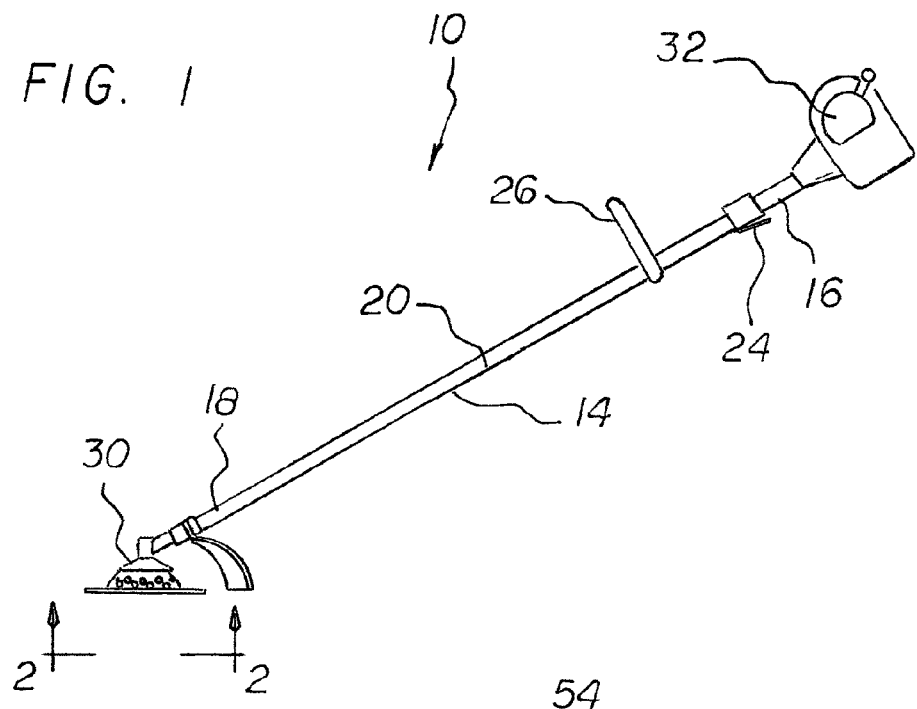
FIG. 1 is a front elevational view of a line trimmer/grinder system constructed in accordance with the principles of the present invention.
Figure 2:
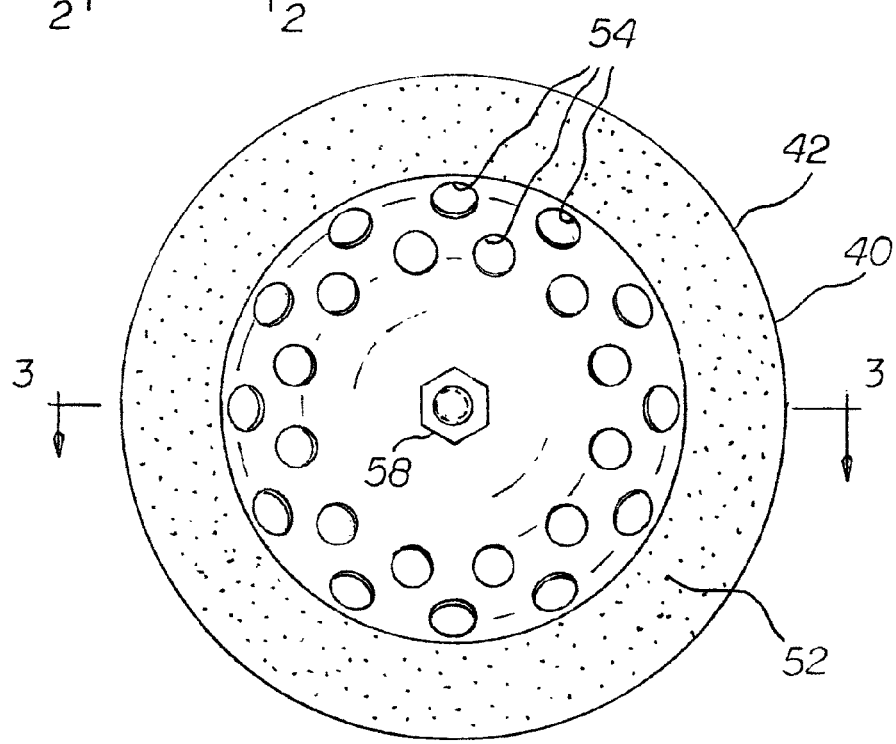
FIG. 2 is a bottom view of the system taken along line 2-2 of FIG. 1.
Figure 3:
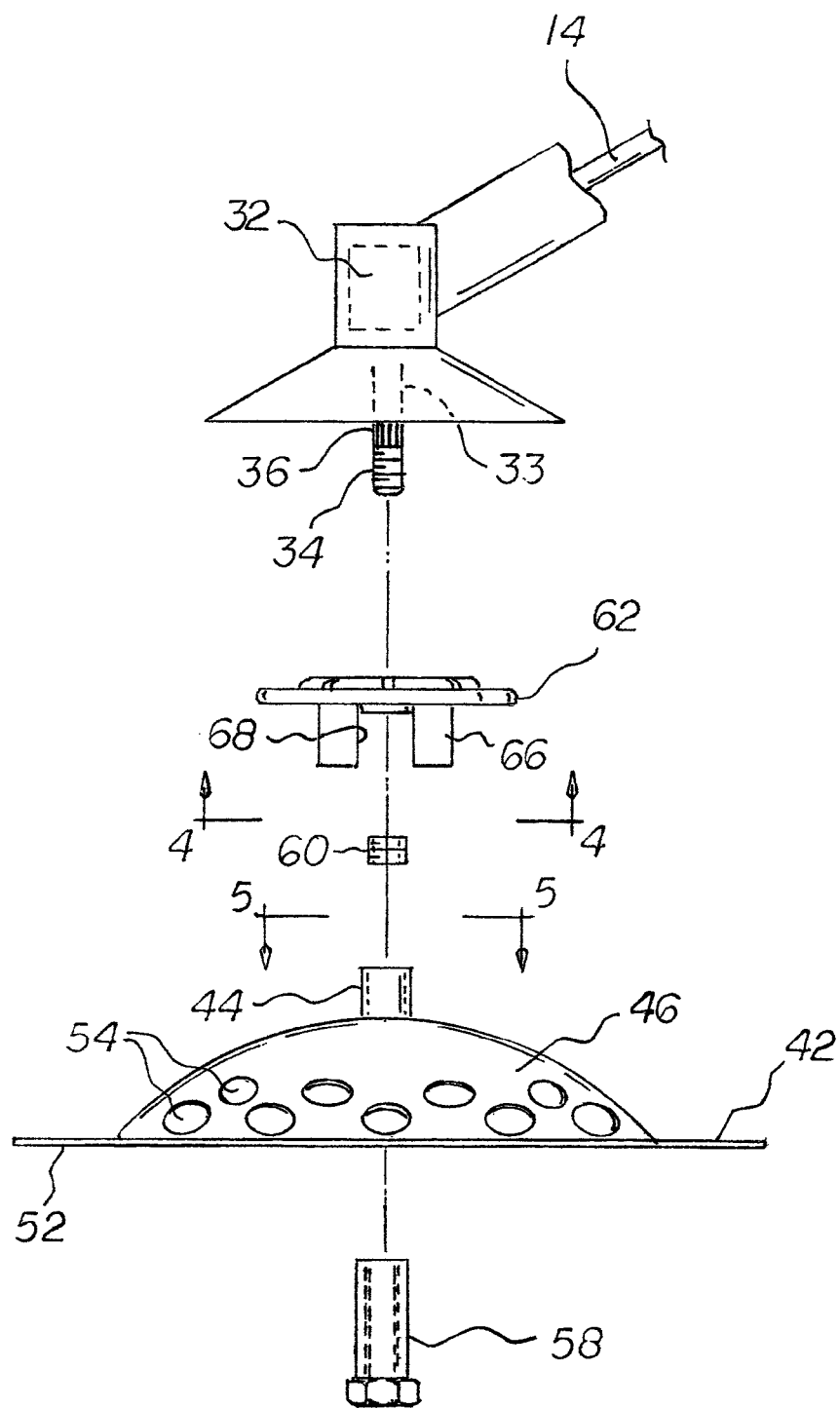
FIG. 3 is an exploded cross sectional view taken along line 3-3 of FIG. 2.
Figure 4:
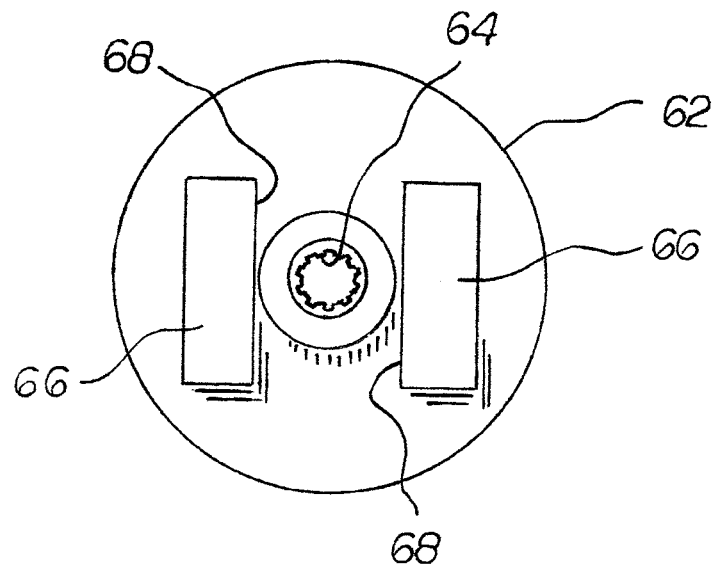
FIG. 4 is a bottom view of a portion of the system taken along line 4-4 of FIG. 3.
Figure 5:
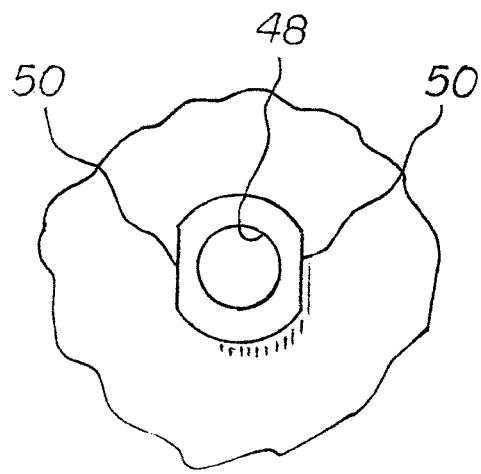
FIG. 5 is a plan view of a portion of the system taken along line 5-5 of FIG. 3.

With reference now to the drawings, and in particular to FIG. 1 thereof, the preferred embodiment of the new and improved line trimmer/grinder system embodying the principles and concepts of the present invention and generally designated by the reference numeral 10 will be described.

The present invention, the line trimmer/grinder system 10 is comprised of a plurality of components. Such components in their broadest context include a support pole, a motor, a grinding component and a bushing. Such components are individually configured and correlated with respect to each other so as to attain the desired objective.

First provided is a support pole 14. The support pole has an upper extent 16. The support pole has a lower extent 18. The support pole has an intermediate extent 20. The intermediate extent is provided between the upper and lower extents. The intermediate extent has an intermediate handle 26.

An operating assembly 30 is provided. The operating assembly is coupled to the lower extent of the support pole. The operating assembly includes a gear box 32. The gear box has a downwardly extending drive shaft 33. The drive shaft is rotatable about a vertical primary axis. Operating controls 24 are provided. The gear box and the drive shaft are operable in response to the operating controls. The drive shaft has a lower free end. The lower free end has male screw threads 34. The drive shaft has splines 36. The splines are provided parallel with the primary axis. The splines are located above the male screw threads.

A grinding component 40 is provided next. The grinding component is adapted to selectively couple with the drive shaft when line trimmer components are removed. The grinding component includes an annular plate 42. The annular plate is provided below. The grinding component includes a cylindrical sleeve 44. The cylindrical sleeve is provided above. The grinding component includes a hemispherical dome 46. The dome is provided between the plate and the sleeve. The sleeve has an interior surface 48. The interior surface is adapted to receive the drive shaft. The sleeve has an exterior surface. The exterior surface has laterally spaced, outwardly facing planar faces 50. The annular plate has a downwardly facing abrasive surface 52. The abrasive surface is preferably fabricated of crushed diamonds. The crushed diamonds are provided in a metal matrix. Other suitable materials include tungsten, carbon steel and other abrasive materials.

The dome has circular ventilation apertures 54 for suction and increased air flow in addition to ventilation. In this manner ground-off particles including solid and fibrous material including grass and plant material from beneath the abrasive surface may pass upward through the ventilation apertures.

Further provided is a bushing 58. The bushing has female screw threads. The bushing is located within the dome. The female screw threads of the bushing are coupled to the male screw threads of the drive shaft. In this manner the dome and abrasive surface are axially secured to the motor. The screw threads of the bushing and drive shaft are left hand screws.

Provided last is an intermediate component 62. The intermediate component is positionable between the motor and the abrasive surface. The intermediate component has a splined interior surface 64. The interior surface receives the splines of the drive shaft. In this manner the splines may rotate concurrently with the drive shaft. The intermediate component has downwardly extending blocks 66. The blocks have inwardly facing faces 68. The faces are positionable in contact with the outwardly facing planar faces 50 of the cylindrical sleeve. In this manner the annular abrasive surface is rotated when the motor is energized through the controls at the upper handle. An intermediate bushing 60 is provided between the intermediate component and the dome. Such intermediate bushing includes an internal spline and external threads.

Figure 6:
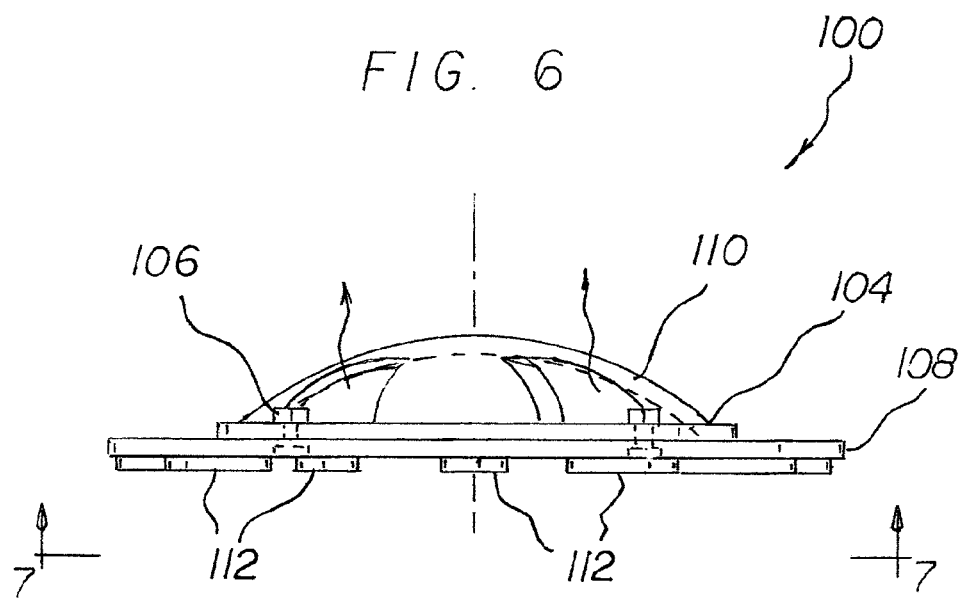
FIG. 6 is a side elevational view of a grinding head constructed in accordance with an alternate embodiment of the invention.
Figure 7:
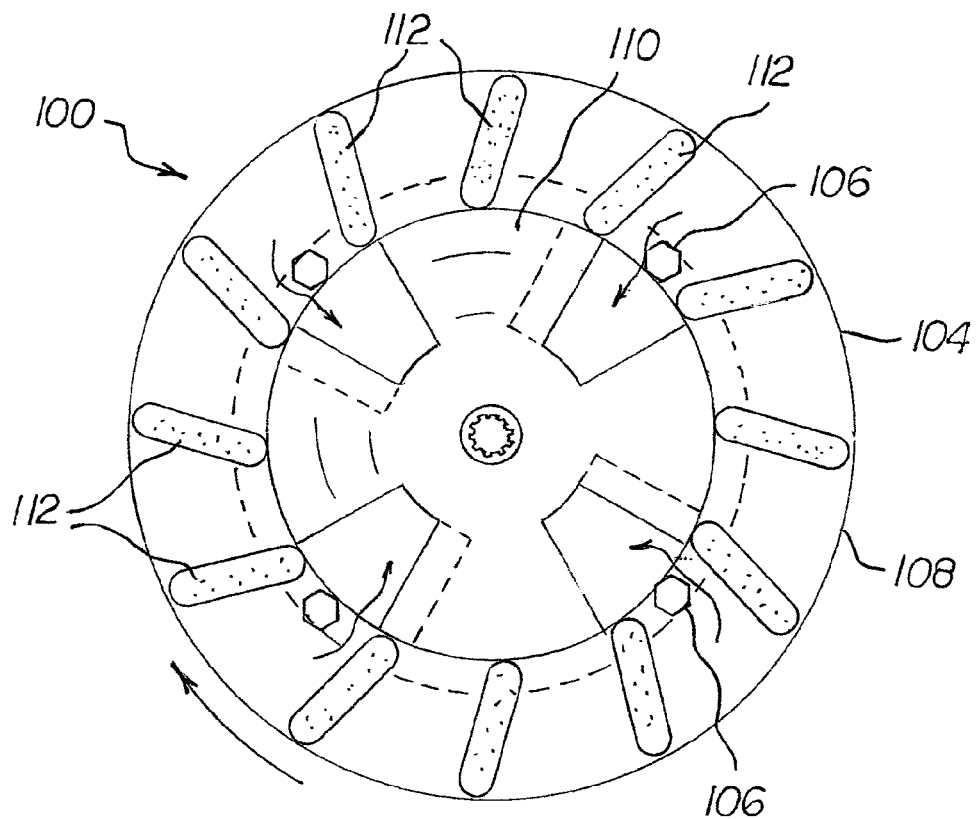
FIG. 7 is a bottom view of a portion of the grinding head taken along line 7-7 of FIG. 6.

Reference is now made to an alternate embodiment 100 of the invention illustrated in FIGS. 6 and 7. A grinding component 104 is provided. The grinding component includes threaded fasteners 106. The grinding component includes an annular plate 108. The grinding component also includes a hemispherical dome 110. The threaded fasteners couple the annular plate to the dome. The grinding surface includes a plurality of elongated segments 112. The elongated segments are secured to the grinding surface. The elongated segments are fabricated of crushed diamonds. The crushed diamonds are provided in a metal matrix.

Figure 8:
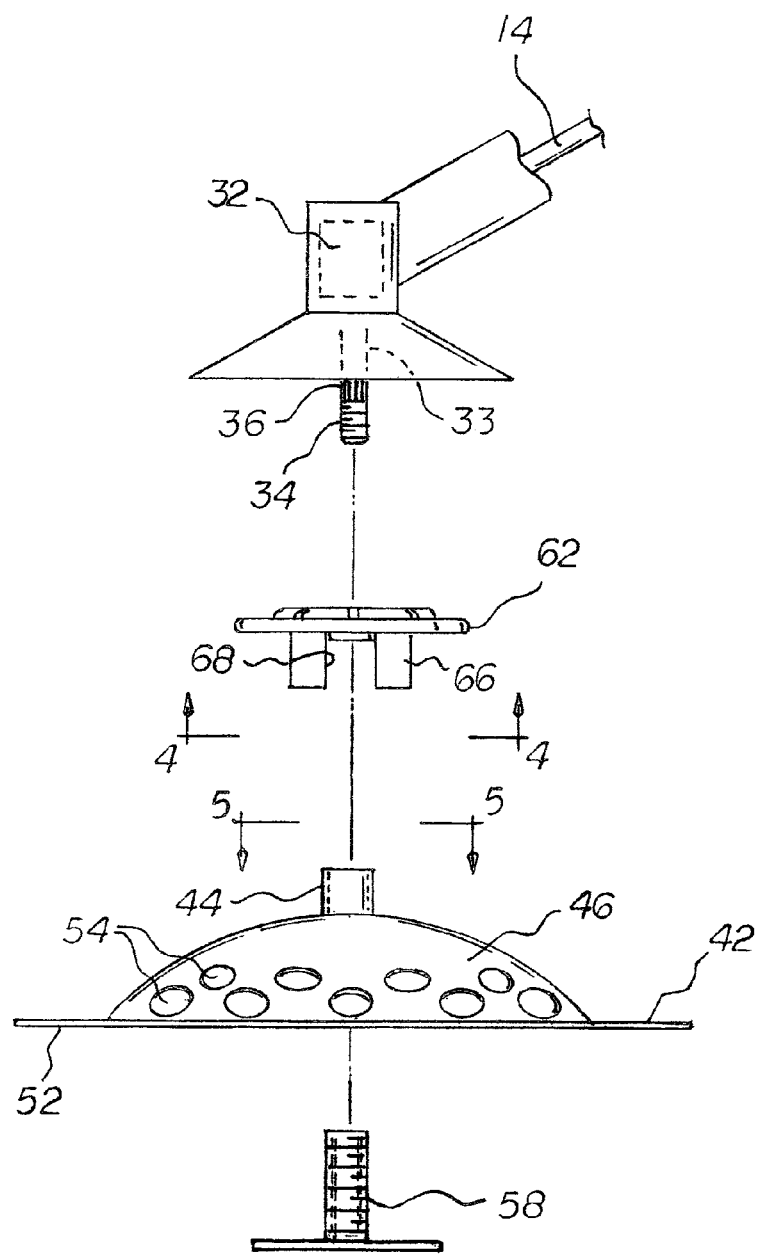
FIG. 8 is a view similar to FIG. 3 but illustrating another alternate embodiment of the invention.

Another alternate embodiment of the invention is illustrated in FIG. 8. In such embodiment, the intermediate bushing is deleted. First provided is a support pole 14. The support pole has an upper extent 16. The support pole has a lower extent 18. The support pole has an intermediate extent 20. The intermediate extent is provided between the upper and lower extents. The intermediate extent has an intermediate handle 26.

An operating assembly 30 is provided. The operating assembly is coupled to the lower extent of the support pole. The operating assembly includes a gear box 32. The gear box has a downwardly extending drive shaft 33. The drive shaft is rotatable about a vertical primary axis. Operating controls 24 are provided. The gear box and the drive shaft are operable in response to the operating controls. The drive shaft has a lower free end. The lower free end has left hand male screw threads 34. The drive shaft has splines 36. The splines are provided parallel with the primary axis. The splines are located above the male screw threads.

A grinding component 40 is provided next. The grinding component is adapted to selectively couple with the drive shaft when line trimmer components are removed. The grinding component includes an annular plate 42. The annular plate is provided below. The grinding component includes a cylindrical sleeve 44. The cylindrical sleeve is provided above. The grinding component includes a hemispherical dome 46. The dome is provided between the plate and the sleeve. The sleeve has an interior surface 48 with right hand screw threads. The sleeve has an exterior surface. The exterior surface has laterally spaced, outwardly facing planar faces 50. The annular plate has a downwardly facing abrasive surface 52. The abrasive surface is preferably fabricated of crushed diamonds. The crushed diamonds are provided in a metal matrix. Other suitable materials include tungsten, carbon steel and other abrasive materials.

The dome has circular ventilation apertures 54 for suction and increased air flow in addition to ventilation. In this manner ground-off particles including solid and fibrous material including grass and plant material from beneath the abrasive surface may pass upward through the ventilation apertures.

Further provided is a bushing 58. The bushing has female screw threads. The bushing is located within the dome. The left hand female screw threads of the bushing are coupled to the left hand male screw threads of the drive shaft. In this manner the dome and abrasive surface are axially secured to the motor. The bushing is formed with right hand male screw threads with the female screw threads of the cylindrical sleeve receiving the right hand male screw threads of the bushing.

Provided last is an intermediate component 62. The intermediate component is positionable between the motor and the abrasive surface. The intermediate component has a splined interior surface 64. The interior surface receives the splines of the drive shaft. In this manner the splines may rotate concurrently with the drive shaft. The intermediate component has downwardly extending blocks 66. The blocks have inwardly facing faces 68. The faces are positionable in contact with the outwardly facing planar faces of the bushing. In this manner the annular abrasive surface is rotated when the motor is energized through the controls at the upper handle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A line trimmer/grinder system comprising:
    a support pole having upper and lower and intermediate extents;
    a motor with a drive shaft coupled to the lower extent of the support pole;
    a grinding component coupled to the drive shaft, the grinding component including an annular plate below and a cylindrical sleeve above and a hemispherical dome there between, the sleeve adapted to receive the drive shaft, the annular plate having a downwardly facing abrasive surface, the dome being formed with ventilation apertures; and
    a bushing coupled to the drive shaft for axial securement and rotational movement of the dome and abrasive surface to the motor.

2. The system as set forth in claim 1 and further including:
    an intermediate component positioned between the motor and the abrasive surface.

3. The system as set forth in claim 1 and further including:
    the abrasive surface is fabricated of crushed diamonds in a metal matrix.

4. The system (100) as set forth in claim 1 wherein the grinding component (104) includes threaded fasteners (106) coupling the annular plate (108) with the hemispherical dome (110), and wherein the grinding surface includes a plurality of elongated segments (112) fabricated of crushed diamonds in a metal matrix.

5. The system as set forth in claim 1 wherein the grinding component includes a hard abrasive material chosen from the class of hard abrasive materials including diamonds, tungsten, carbon steel and other abrasive materials.

6. A line trimmer/grinder system (10) adapted for conversion between a device for trimming lawn/yard growth and a device for grinding hard planar construction surfaces, the conversion being done in a safe, convenient and economical manner, the system comprising, in combination:
    a support pole (14) having an upper extent (16) and a lower extent (18) and an intermediate extent (20) between the upper and lower extents, the intermediate extent having an intermediate handle (26);
    an operating assembly (30) coupled to the lower extent of the support pole, the operating assembly including a gear box (32) with a downwardly extending drive shaft (33) rotatable about a vertical primary axis, the gear box and the drive shaft being operable in response to operating controls (24), the drive shaft having a lower free end with male screw threads (34), the drive shaft having splines (36) parallel with the primary axis, the splines being located above the male screw threads;

a grinding component (40) adapted to selectively couple with the drive shaft when line trimmer components are removed, the grinding component including an annular plate (42) below and a cylindrical sleeve (44) above and a hemispherical dome (46) between the Plate and the sleeve, the sleeve having an interior surface (48) adapted to receive the drive shaft, the sleeve having an exterior surface with laterally spaced, outwardly facing planar faces (50), the annular plate having a downwardly facing abrasive surface (52), the abrasive surface being fabricated of crushed diamonds in a metal matrix, the dome being formed with circular ventilation apertures (54) for suction and increased air flow in addition to ventilation for upward passage of ground-off particles including solid and fibrous material including grass and plant material from beneath the abrasive surface and upward passage through the ventilation apertures;

a bushing (58) formed with female screw threads, the bushing being located within the dome with the female screw threads of the bushing coupled to the male screw threads of the drive shaft for axial securement of the dome and abrasive surface to the motor, the screw threads of the bushing and drive shaft being left hand screws; and an intermediate component (62) positionable between the motor and the abrasive surface, the intermediate component having a splined interior surface (64) receiving the splines of the drive shaft for concurrent rotation there with, the intermediate component having downwardly extending blocks (66) with inwardly facing faces (68) positionable in contact with the outwardly facing planar faces (50) of the cylindrical sleeve for rotating the annular abrasive surface when the motor is energized through the controls, an intermediate bushing (60) between the intermediate component and the dome.

7. A line trimmer/grinder system (10) adapted for conversion between a device for trimming lawn/yard growth and a device for grinding hard planar construction surfaces, the conversion being done in a safe, convenient and economical manner, the system comprising, in combination:

a support pole (14) having an upper extent (16) and a lower extent (18) and an intermediate extent (20) between the upper and lower extents, the intermediate extent having an intermediate handle (26);

an operating assembly (30) coupled to the lower extent of the support pole, the operating assembly including a gear box (32) with a downwardly extending drive shaft (33) rotatable about a vertical primary axis, the gear box and the drive shaft being operable in response to operating controls (24), the drive shaft having a lower free end with left hand male screw threads (34), the drive shaft having splines (36) parallel with the primary axis, the splines being located above the male screw threads;

a grinding component (40) adapted to selectively couple with the drive shaft when line trimmer components are removed, the grinding component including an annular plate (42) below and a cylindrical sleeve (44) above and a hemispherical dome (46) between the plate and the sleeve, the sleeve having an interior surface (48) with right hand female screw threads, the sleeve having an exterior surface with laterally spaced, outwardly facing planar faces (50), the annular plate having a downwardly facing abrasive surface (52), the abrasive surface being fabricated of crushed diamonds in a metal matrix, the dome being formed with circular ventilation apertures (54) for suction and increased air flow in addition to ventilation for upward passage of ground-off particles including solid and fibrous material including grass and plant material from beneath the abrasive surface and upward passage through the ventilation apertures;

a bushing (58) formed with left hand female screw threads, the bushing being located within the dome with the left hand female screw threads of the bushing coupled to the left hand male screw threads of the drive shaft for axial securement of the dome and abrasive surface to the motor, the bushing being formed with right hand male screw threads, the female screw threads of the cylindrical sleeve receiving the right hand male screw threads of the bushing; and an intermediate component (62) positionable between the motor and the abrasive surface, the intermediate component having a splined interior surface (64) receiving the splines of the drive shaft for concurrent rotation there with, the intermediate component having downwardly extending blocks (66) with inwardly facing faces (68) positionable in contact with the outwardly facing planar faces (50) of the cylindrical sleeve for rotating the annular abrasive surface when the motor is energized through the controls.

* * * * *